US009748600B2

(12) United States Patent
Tang et al.

(10) Patent No.: US 9,748,600 B2
(45) Date of Patent: Aug. 29, 2017

(54) PHOSPHATE BASED COMPOSITE ANODE MATERIAL, PREPARATION METHOD AND USE THEREOF

(75) Inventors: Yuanhao Tang, Zhejiang (CN); Chenyun Wang, Zhejiang (CN); Deyu Wang, Zhejiang (CN); Jun Li, Zhejiang (CN)

(73) Assignee: Ningbo Institute of Materials Technology & Engineering, Chinese Academy of Sciences, Ningbo (CN)

( * ) Notice: Subject to any disclaimer, the term of this patent is extended or adjusted under 35 U.S.C. 154(b) by 36 days.

(21) Appl. No.: 14/373,604

(22) PCT Filed: Sep. 12, 2012

(86) PCT No.: PCT/CN2012/081298
§ 371 (c)(1),
(2), (4) Date: Oct. 2, 2014

(87) PCT Pub. No.: WO2013/107186
PCT Pub. Date: Jul. 25, 2013

(65) Prior Publication Data
US 2015/0125749 A1    May 7, 2015

(30) Foreign Application Priority Data

Jan. 20, 2012   (CN) .................. CN2012 1 0019392

(51) Int. Cl.
| | |
|---|---|
| *H01M 10/0525* | (2010.01) |
| *H01M 4/36* | (2006.01) |
| *H01M 4/58* | (2010.01) |
| *H01M 4/1393* | (2010.01) |

(Continued)

(52) U.S. Cl.
CPC ..... *H01M 10/0525* (2013.01); *H01M 4/0471* (2013.01); *H01M 4/1393* (2013.01);
(Continued)

(58) Field of Classification Search
CPC .................. H01M 4/136; H01M 10/0525
See application file for complete search history.

(56) References Cited

U.S. PATENT DOCUMENTS

2010/0283012 A1* 11/2010 Hibst ..................... C01B 25/45
252/507
2010/0301281 A1  12/2010 Hibst et al.

FOREIGN PATENT DOCUMENTS

| CN | 1677718 A | 10/2005 |
| CN | 101252187 A | 8/2008 |

(Continued)

OTHER PUBLICATIONS

Rui et al. (Journal of Power Sources vol. 196, Issue 4, Feb. 15, 2011, pp. 2279-2282).*

(Continued)

*Primary Examiner* — Olatunji Godo
(74) *Attorney, Agent, or Firm* — Flaster/Greenberg P.C.

(57) ABSTRACT

The present invention relates to a novel phosphate based composite anode material, preparation method and uses thereof. Specifically disclosed is a phosphate based composite cell anode material, the material having monoclinic and orthorhombic crystal lattice structures with the chemical formula of $A_{3-x}V_{2-y}M_y(PO_4)_3$, wherein A is $Li^+$, $Na^+$ or the mixture thereof, M is Mg, Al, Sc, Ti, Cr, Mn, Fe, Co, Ni, Cu, Zn or Nb, $0 \leq x \leq 3.0$, $0 \leq y \leq 2.0$, and C is the carbon layer. Also disclosed are a preparation method and uses of the composite material. Unlike simple physical mixing, the composite material of the present invention has the advantages of an adjustable electric potential plateau, high reversible capacity, good cycle stability, power consumption early warning and the like.

16 Claims, 9 Drawing Sheets

(51) Int. Cl.
  *H01M 4/583* (2010.01)
  *H01M 10/052* (2010.01)
  *H01M 4/04* (2006.01)
  *H01M 4/62* (2006.01)

(52) U.S. Cl.
  CPC ........... *H01M 4/366* (2013.01); *H01M 4/583* (2013.01); *H01M 4/5825* (2013.01); *H01M 4/0402* (2013.01); *H01M 4/625* (2013.01); *H01M 10/052* (2013.01); *H01M 2220/20* (2013.01)

(56) References Cited

FOREIGN PATENT DOCUMENTS

| | | | |
|---|---|---|---|
| CN | 101883735 A | 11/2010 | |
| CN | 102123943 A | 7/2011 | |
| CN | 102569797 A | 7/2012 | |

OTHER PUBLICATIONS

PCT Search Report from PCT/CN2012/081298, 6 pages (Dec. 27, 2012).

Jian et al., Carbon Coated Na3V2(PO4)3 as Novel Electrode Material for Sodium Ion Batteries, Electrochemistry Communications, 14, 86-89 (2012).

Cushion et al., Li2NaV2(PO4)3: A 3.7 V Lithium-Insertion Cathode with the Rhombohedral NASICON Structure, J. Solid State Chemistry, 162, 176-181 (2001).

Padhi et al., Mapping of Transition Metal Redox Energies in Phosphates with NASICON Structure by Lithium Intercalation, J. Electrochem. Soc., vol. 144, No. 8, 2581-2586 (1997).

Gopalakrishnan et al., V2(PO4)3: A Novel NASICON-Type Vanadium Phosphate Synthesized by Oxidative Deintercalation of Sodium from Na3V2(PO4)3, Chem. Mater. 4, 747-749 (1992).

Third Chinese Office Action in Chinese Counterpart Application No. 2012100193927, dated Nov. 2, 2014 (11 pages).

* cited by examiner

PHOSPHATE BASED COMPOSITE ANODE MATERIAL, PREPARATION METHOD AND USE THEREOF

BACKGROUND OF THE INVENTION

Field of the Invention

The invention relates to the field of electrode materials and electrochemical energy storage, and, in particular, to a novel phosphate based composite anode material, preparation method and use thereof.

Description of Related Art

Due to the problems of traditional energy, such as non-renewability, environmental pollution, there are great concerns for clean energy all over the world. Clean energy, to name a few, currently includes nuclear, solar, wind, hydro and bio-energy. Obtaining clean energy from nature has become an emerging technology, prompting the booming development of clean energy storage technologies.

Therein, the secondary-ion battery (e.g. lithium-ion battery, sodium-ion battery, etc.), especially the lithium-ion battery, attracts great attention due to its characteristics, such as lack of memory, high energy density, long service life, good safety, non-toxicity, low pollution, and becomes the most preferred choice for electric vehicle battery.

The lithium ion battery anode material is the most important component for the battery and the key factor determining the capacity, safety, service life and price of the lithium-ion battery. The currently commonly used anode materials are lithium cobalt oxide ($LiCoO_2$), lithium nickel cobalt manganese ternary materials ($LiNi_{1/3}Co_{1/3}Mn_{1/3}O_2$), lithium manganese oxide ($LiMn_2O_4$), phosphate ($LiFePO_4$, $Li_3V_2(PO_4)_3$), and so on. Among these materials, lithium cobalt oxide ($LiCoO_2$) is the most researched and the market leader. However, it is expensive, detrimentally effects environment and lithium cobalt oxide has poor safety and, therefore, it can not be used in the field of power batteries. Nickel cobalt manganese lithium ternary materials ($LiNi_{1/3}Co_{1/3}Mn_{1/3}O_2$) are unstable in lattice structure, prone to produce oxygen, and of high cost and poor safety, thereby seriously affecting its practical application. Lithium manganate ($LiMn_2O_4$) has low reversible capacity, about 110 mAh/g in practice, and lower volume capacity. The manganese ions in the crystal lattice are prone to dissolve above 55° C., causing structural damage to the crystal, poor cycle stability and life. While lithium iron phosphate ($LiFePO_4$) of the phosphate series has a good cycle stability, safety, and a high reversible capacity, its low voltage platform and low tap density result in a lower volume capacity and weight capacity, and it is difficult to monitor battery capacity due to the flat voltage platform.

Recently, Lithium vanadium phosphate ($Li_3V_2(PO_4)_3$), which belongs to polyanionic anode material, has attracted great attention due to the high-voltage, high-capacity and high stability characteristic of polyanionic material as well as good cycle performance and a wide range of temperature adaptability. However, the pure phase lithium vanadium phosphate ($Li_3V_2(PO_4)_3$) is expensive, and its 4.6V voltage platform can not be physically applied under the current electrolyte system, resulting in the actual reversible capacity of about 130 mAh/g, therefore it is difficult to use it independently. Moreover, lithium resources of the world are relatively limited and mostly concentrated in South America, therefore, the large-scale use of lithium-ion batteries will inevitably lead to the depletion of such resources.

Consequently, there is an urgent need to develop an anode composite material which is inexpensive and has good electrochemical performance.

BRIEF SUMMARY OF THE INVENTION

The objective of the present invention is to provide a novel phosphate-based anode composite material with a good electrochemical performance, low cost, and the preparation method and use thereof.

In the first aspect of the present invention, it provides a phosphate-based battery anode composite material, which comprises (1) crystal grain of lithium vanadium phosphate salt/sodium vanadium phosphate salt, and (2) the carbon layer coated on the outer layer of the crystal grain, wherein the crystal grain has monoclinic and orthorhombic lattice structures.

In another preferred embodiment, in the composite material, the molar content of the crystal grain having an orthorhombic lattice structure ($P_{orthorhombic}$) is 1-99% of the total moles of crystal grain of vanadium phosphate disodium salt/lithium vanadium phosphate salt.

In another preferred embodiment, the lithium vanadium phosphate salt in the crystal grain has both of orthorhombic and monoclinic lattice structures, or only monoclinic lattice structure.

In another preferred embodiment, the vanadium phosphate disodium salt in the crystal grains has orthorhombic lattice structure.

In another preferred embodiment, the formula of the composite material is $A_{3-x}V_{2-y}M_y(PO_4)_3/C$, wherein A is $Li^+$, $Na^+$ or a mixture thereof, M is Mg, Al, Sc, Ti, Cr, Mn, Fe, Co, Ni, Cu, Zn or Nb, $0 \leq x \leq 3.0$, $0 \leq y \leq 2.0$; and C is carbon layer.

In another preferred embodiment, the formula of the composite material is $A_{3-x}V_{2-y}M_y(PO_4)_3/C$, wherein A is $Li^+$, $Na^+$ or a mixture thereof, M is Mg, Al, Sc, Ti, Cr, Mn, Fe, Co, Ni, Cu, Zn or Nb, $0 \leq x < 3.0$, $0 \leq y < 2.0$; and C is carbon layer.

In another preferred embodiment, the formula is $A_{3-x}V_2(PO_4)_3/C$, wherein A is $Li^+$, $Na^+$ or a mixture thereof, $0 \leq x \leq 3.0$, and C is carbon layer; preferably, $0 \leq x < 3.0$.

In another preferred embodiment, the formula is $A_{3-x}V_2(PO_4)_3/C$, wherein A is the mixture of $Li^+$, $Na^+$, $0 \leq x \leq 3.0$, and C is carbon layer; preferably, $0 \leq x < 3.0$.

In another preferred embodiment, the formula of the composite material is $Li_{3-x-a}Na_aV_{2-y}M_y(PO_4)_3/C$, wherein $0 \leq a \leq 1.0$, $0 \leq y \leq 2.0$, $0 \leq x \leq 3-a$, M is Mg, Al, Sc, Ti, Cr, Mn, Fe, Co, Ni, Cu, Zn or Nb, and C is carbon layer.

In another preferred embodiment, the formula of the composite material is $Li_{3-x-a}Na_aV_{2-y}M_y(PO_4)_3/C$, wherein $0 \leq a \leq 1.0$, $0 \leq y < 2.0$, $0 \leq x < 3-a$, M is Mg, Al, Sc, Ti, Cr, Mn, Fe, Co, Ni, Cu, Zn or Nb, and C is carbon layer.

In another preferred embodiment, the formula is $Li_{3-x-a}Na_aV_2(PO_4)_3/C$, wherein $0 \leq a \leq 1.0$, and C is carbon layer; more preferably, $0 \leq x < 3-a$.

In another preferred embodiment, the composite material is used in the lithium ion battery, wherein the sodium ion does not participate in the reaction during the charging and discharging process.

In another preferred embodiment, the formula of the composite material is $Na_{3-x-b}Li_bV_{2-y}M_y(PO_4)_3/C$, wherein $0 \leq b \leq 1.0$, $0 \leq y \leq 2.0$, $0 \leq x \leq 3-b$, M is Mg, Al, Sc, Ti, Cr, Mn, Fe, Co, Ni, Cu, Zn or Nb; and C is carbon layer.

In another preferred embodiment, the formula of the composite material is $Na_{3-x-b}Li_bV_{2-y}M_y(PO_4)_3/C$, wherein $0 \leq b \leq 1.0$, $0 \leq y < 2.0$, $0 \leq x < 3-b$, M is Mg, Al, Sc, Ti, Cr, Mn, Fe, Co, Ni, Cu, Zn or Nb; and C is carbon layer.

In another preferred embodiment, the formula is $Na_{3-x-b}Li_bV_2(PO_4)_3/C$, wherein $0 \leq b \leq 1.0$, $0 \leq x \leq 3-b$, and C is carbon layer; preferably, $0 \leq x < 3-b$.

In another preferred embodiment, the composite material is used in the sodium lithium ion battery, wherein the lithium ion does not participate in the reaction during the charging and discharging process.

In another preferred embodiment, the formula of the composite material is $Li_{3-a-x}Na_{a-z}V_{2-y}M_y(PO_4)_3/C$, wherein $0.1 \leq a \leq 2.9$, $0 \leq x \leq 3-a$, $0 \leq z \leq a$, $0 \leq y \leq 2.0$, M is Mg, Al, Sc, Ti, Cr, Mn, Fe, Co, Ni, Cu, Zn or Nb, and C is carbon layer.

In another preferred embodiment, the formula of the composite material is $Li_{3-a-x}Na_{a-z}V_{2-y}M_y(PO_4)_3/C$, wherein $0.1 \leq a < 2.9$, $0 \leq x < 3-a$, $0 \leq z \leq a$, $0 \leq y \leq 2.0$, M is Mg, Al, Sc, Ti, Cr, Mn, Fe, Co, Ni, Cu, Zn or Nb, and C is carbon layer.

In another preferred embodiment, the formula is $Li_{3-a-x}Na_{a-z}V_2(PO_4)_3/C$, wherein $0.1 \leq a \leq 2.9$, $0 \leq x \leq 3-a$, $0 \leq z \leq a$, and C is carbon layer; preferably $0 \leq x < 3-a$, $0 \leq z < a$.

In another preferred embodiment, the composite material is used in the secondary battery, wherein both of the lithium ion and sodium ion are involved in reactions during the charging and discharging process.

In another preferred embodiment, the composite material has one to four voltage plateaus; preferably, the platform voltage is selected from the group consisting of about 3.6V, about 3.7V, about 3.8V, and about 4.1V.

In another preferred embodiment, in the anode composite material (or crystal grain of Lithium vanadium phosphate salt/vanadium phosphate disodium salt), the molar ratio of Li and Na is selected from the group consisting of: 3.0-1.5: 0-1.5, and preferably 2.0:1.0.

In another preferred embodiment, the content of carbon layer is 0.1-40 wt % of the total weight of the composite material; and/or, the carbon source is pyrolytic carbon, graphite, or a mixture thereof.

In another preferred embodiment, the carbon source is selected from the group consisting of: sucrose, glucose, starch, conductive carbon black, carbon nanotube, carbon fiber, or graphene.

In another preferred embodiment, the preparation method for the composite material includes the steps of:

(1) Weighing the lithium source material, sodium source material, vanadium source material and phosphate source material by the molar ratio of lithium, sodium, vanadium, phosphate as 1.00-2.70:2.00-0.30:2.00:3.00, adding the carbon source material (carbon source material is added in an amount of 0.1-40 wt % of the total composite weight) and mixing, adding a dispersant, and treating the mixture with a ball mill, thereby forming a precursor treated by ball milling;

(2) In the presence of protective gas, heat-sintering the precursor treated by ball milling obtained in step (1), thereby obtaining the anode composite material according to the first aspect of the present invention.

In another preferred embodiment, there is a drying step between step (1) and step (2): drying the precursor treated by ball milling obtained in step (1), thereby obtaining a precursor treated by ball milling and dried.

In another preferred embodiment, the dispersant is anhydrous ethyl alcohol or ethylene glycol.

In the second aspect of the present invention, it provides a battery anode, wherein the battery anode comprises the anode composite material in the first aspect of the present invention.

In another preferred embodiment, the anode further comprises a conductive agent (preferably acetylene black) and a binder (preferably polyvinylidene fluoride).

In the third aspect of the present invention, it provides a secondary battery comprises the battery anode in the second aspect of the present invention.

In the fourth aspect of the present invention, it provides a secondary battery, wherein the secondary battery comprises an anode material, cathode material, separator, electrolyte, and shell, wherein the anode material includes the phosphate-based battery anode composite material according to the first aspect of the present invention.

In another preferred embodiment, the cathode material comprises natural graphite, artificial graphite, mesophase carbon microbeads, silicon carbide, lithium metal sheet, or lithium titanate.

In another preferred embodiment, the separator is PP & PE separator, or a glass fiber separator.

In the fifth aspect of the present invention, it provides a preparation method of the anode composite material in the first aspect of the present invention, wherein the method includes the steps of:

(1) Weighing lithium source material, sodium source material, vanadium source material and phosphate source material by the molar ratio of lithium, sodium, vanadium, phosphate as 1.00-2.70:2.00-0.30:2.00:3.00, adding the carbon source material (carbon source material is added in an amount of 0.1-40 wt % of the total composite material weight) and mixing, adding a dispersant, and then treating the mixture with a ball mill, thereby forming a precursor treated by ball milling;

(2) In the presence of protective gas, heat-sintering the precursor treated by ball milling obtained in step (1), thereby obtaining the anode composite material in the first aspect of the present invention.

In another preferred embodiment, there is a drying step between step (1) and step (2): drying the precursor treated by ball milling obtained in step (1), thereby obtaining a precursor treated by ball milling and dried.

In another preferred embodiment, the dispersant is anhydrous ethyl alcohol or ethylene glycol.

In another preferred embodiment, the heat-sintering in step (2) involves roasting at 300-500° C. for 2-20 h, then for another 8-40 h at 600-900° C.

In another preferred embodiment, the protective gas is hydrogen, nitrogen, argon or a mixture thereof.

In the sixth aspect of the present invention, it provides the use of the composite material in the first aspect of the present invention, for preparing the secondary battery in the third aspect and the fourth aspect of the present invention.

It should be understood that in the present invention, the technical features specifically above and below (such as the Examples) can be combined with each other, thereby constituting a new or preferred technical solution which needs not be individually described.

DETAILED DESCRIPTION OF THE INVENTION

Figure 1A:
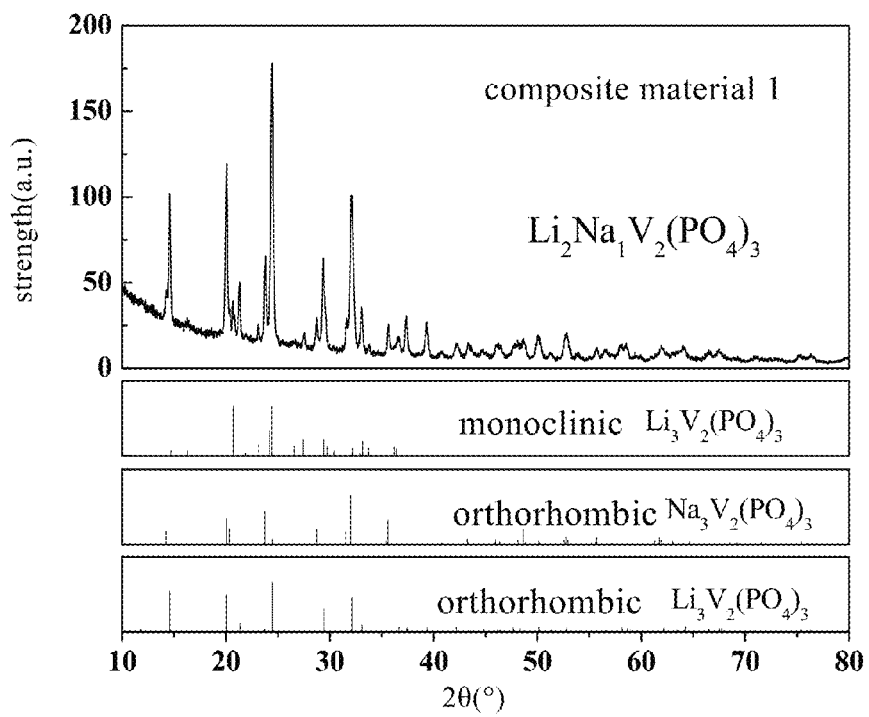
FIG. 1A shows X-ray diffraction pattern of the composite material 1, as prepared in Example 1.

Through comprehensive and intensive research, the inventors have unexpectedly discovered that the amount of the expensive lithium ion can be reduced by doping sodium ion in lithium vanadium phosphate, thus significantly lowering the cost for preparing the phosphate-based battery anode composite material. The phosphate-based battery anode composite material prepared in the present invention has two lattice structures, i.e., orthorhombic and monoclinic lattice structures. The plateau voltage can be regulated by adjusting the molar ratio of lithium and sodium (for example, shortening the minimum and maximum voltage plateau, increasing the intermediate voltage plateau in a plurality of voltage platforms), thereby achieving the electric capacity forecasting of battery and preparing various of battery anode materials to meet varying requirements. The present invention is accomplished based on the above findings.

Sodium Ion Battery Anode Materials

At present, the sodium ion battery anode materials are mainly sodium-depleted layered compound (e.g., cobalt sodium or manganese sodium), NaMF3 (M=Fe, Mn, Ni) of a perovskite structure, a fluorine-containing compound such as $Na_2FePO_4F$, $NaVPO_4F$, etc.

The sodium vanadium phosphate ($Na_3V_2(PO_4)_3$) anode material in the invention which has monoclinic and/or orthorhombic structure, is a potential sodium ion battery anode material.

Lithium Vanadium Phosphate($Li_3V_2(PO_4)_3$)

Lithium vanadium phosphate ($Li_3V_2(PO_4)_3$) is another anode material with high potential, the compound belongs to the compounds having NASICON monoclinic structure, and the compound has 197 mAh/g of theoretical specific capacity, high potential, high electric conductivity and multiple voltage platforms. However, pure phase $Li_3V_2(PO_4)_3$ has some disadvantages, such as high cost, and its 4.6V voltage platform which can not be physically applied under the current electrolyte system, resulting in the actual reversible capacity of about 130 mAh/g, therefore, it is difficult to use it independently.

Lithium vanadium phosphate anode material in the present invention has two crystal structures, i.e., monoclinic and/or orthorhombic.

Phosphate-Based Battery Anode Composite Material

The present invention provides a phosphate-based battery anode composite material, which comprises crystal grains of lithium vanadium phosphate salt/vanadium phosphate disodium salt and carbon layer coated on the outer layer of the crystal grains, wherein the crystal grains have monoclinic and orthorhombic lattice structures.

As used herein, the term "crystal grain of lithium vanadium phosphate/sodium vanadium phosphate" refers to a grain comprising lithium vanadium phosphate and/or sodium vanadium phosphate. When the crystal grain of lithium vanadium phosphate salt/sodium vanadium phosphate is the crystal grain of lithium vanadium phosphate salt, the crystal grain of lithium vanadium phosphate salt has monoclinic and orthorhombic crystal structures. When the crystal grain of lithium vanadium phosphate salt/sodium vanadium phosphate is the crystal grain of sodium vanadium phosphate salt, the crystal grain of sodium vanadium phosphate salt has monoclinic and orthorhombic crystal structures.

The coating may be complete coating or partial coating.

In addition to the crystal grain of lithium vanadium phosphate salt/sodium vanadium phosphate salt, the composite material can be a crystal grain comprising other metal phosphate salt, and the metal includes (but not limited to) a metal atom selected from the group consisting of: Mg, Al, Sc, Ti, Cr, Mn, Fe, Co, Ni, Cu, Zn, Nb, etc.

In another preferred embodiment, the formula of the composite material is $A_{3-x}V_{2-y}M_y(PO_4)_3/C$, wherein A is $Li^+$, $Na^+$ or a mixture thereof, M is Mg, Al, Sc, Ti, Cr, Mn, Fe, Co, Ni, Cu, Zn or Nb, $0 \leq x \leq 3.0$, $0 \leq y \leq 2.0$; and C is carbon layer.

Preferably, the formula is $A_{3-x}V_2(PO_4)_3/C$, wherein A is $Li^+$, $Na^+$ or a mixture thereof, $0 \leq x \leq 3.0$. More preferably, A is a mixture of $Li^+$ and $Na^+$.

In the composite material, the molar content of crystal grain having an orthorhombic structure ($P_{orthorhombic}$) is 1-99% of the total moles of crystal grains of vanadium phosphate disodium salt/Lithium vanadium phosphate salt.

The content of the carbon layer is 0.1-40 wt % of the total weight of the composite material, and the carbon source is pyrolytic carbon, graphite, or a mixture thereof. Preferably, the carbon source is selected from the group consisting of: sucrose, glucose, starch, conductive carbon black, carbon nanotube, carbon fiber, or graphene.

In another preferred embodiment, the formula of the composite material is $Li_{3-x-a}Na_aV_{2-y}M_y(PO_4)_3/C$, wherein $0 \leq a \leq 1.0$, $0 \leq y \leq 2.0$, $0 \leq x \leq 3-a$, M is Mg, Al, Sc, Ti, Cr, Mn, Fe, Co, Ni, Cu, Zn or Nb. Preferably, the formula is $Li_{3-x-a}Na_aV_2(PO_4)_3/C$, wherein $0 \leq a \leq 1.0$, and $0 \leq x < 3-a$. The composite material can be used in the lithium ion battery, wherein the sodium ion does not participate in the reaction during the charging and discharging process.

In another preferred embodiment, the formula of the composite material is $Na_{3-x-b}Li_bV_{2-y}M_y(PO_4)_3/C$, wherein $0 \leq b \leq 1.0$, $0 \leq y \leq 2.0$, $0 \leq x \leq 3-b$, M is Mg, Al, Sc, Ti, Cr, Mn, Fe, Co, Ni, Cu, Zn or Nb. Preferably, the formula is $Na_{3-x-b}Li_bV_2(PO_4)_3/C$, wherein $0 \leq b \leq 1.0$, and $0 \leq x < 3-b$. The composite material can be used in the sodium ion battery, wherein the lithium ion does not participate in the reaction during the charging and discharging process.

In another preferred embodiment, the formula of the composite material is $Li_{3-a-x}Na_{a-z}V_{2-y}M_y(PO_4)_3/C$, wherein $0.1 \leq a \leq 2.9$, $0 \leq x \leq 3-a$, $0 \leq z \leq a$, $0 \leq y \leq 2.0$, and M is Mg, Al, Sc, Ti, Cr, Mn, Fe, Co, Ni, Cu, Zn or Nb. Preferably, the formula is $Li_{3-a-x}Na_{a-z}V_2(PO_4)_3/C$, wherein $0.1 \leq a \leq 2.9$, $0 \leq x \leq 3-a$, and $0 \leq z \leq a$. The composite material is used in the secondary battery, wherein both of lithium ion and sodium ion is involved in the reactions during the charging and discharging process.

In another preferred embodiment, the formula of the composite material is $Li_{3-x}V_{2-y}M_y(PO_4)_3/C$, wherein M is Mg, Al, Sc, Ti, Cr, Mn, Fe, Co, Ni, Cu, Zn or Nb, $0 \leq x \leq 3.0$ (preferably $0 \leq x < 3.0$), $0 \leq y \leq 2.0$ (preferably $0 \leq y < 2.0$), with the crystal grain of the composite material having orthorhombic and monoclinic crystal structures In another preferred embodiment, the formula of the composite material is $Na_{3-x}V_{2-y}M_y(PO_4)_3/C$, wherein M is Mg, Al, Sc, Ti, Cr, Mn, Fe, Co, Ni, Cu, Zn or Nb, $0 \leq x \leq 3.0$ (preferably $0 \leq x < 3.0$), and $0 \leq y \leq 2.0$ (preferably $0 \leq y < 2.0$), and the crystal grain of the composite material has orthorhombic and monoclinic lattice structures.

Preparation of Phosphate-Based Battery Anode Composite Material

The lithium source material, manganese source material, iron source material, vanadium source material, phosphate source material, carbon source material and equipments required for the preparation method of the present invention can be bought from the market. For the experimental methods without particular conditions, they are performed under routine conditions or as instructed by the manufacturer. For example, the equipments for processing the precursor are: high energy ball mill, stainless steel tank and stainless steel ball; in the argon and hydrogen mixed gas, the hydrogen content is 0-10%, and an impurity content is less than 0.01%; and for ball mill, planetary ball mill, stainless steel balls (10 mm of ball diameter) and tank, dry grinding processes, etc, are used.

The compounding modes of two crystal grains according to the present invention are thermo-chemical compounding (e.g. after roasting at 300-500° C. for 4-20 h, then heating to 600-900° C. and roasting for 8-40 h), physical compounding at room temperature (e.g. mixing by ball milling), or thermo-chemical compounding following physical mixing at room temperature (e.g., heat-treatment following ball mill mixing), preferably thermo-chemical compounding following physical mixing at room temperature.

The lithium source materials comprise lithium dihydrogen phosphate, lithium carbonate, lithium hydroxide, lithium fluoride, lithium nitrate, lithium phosphate, lithium acetate, or a combination thereof;

The sodium source materials comprise sodium dihydrogen phosphate, sodium carbonate, sodium hydroxide, sodium fluoride, sodium nitrate, sodium phosphate, sodium acetate or a combination thereof;

The vanadium source materials comprise vanadium pentoxide, ammonium metavanadate or a combination thereof;

The phosphate source materials comprise ammonium dihydrogen phosphate, manganese phosphate, iron phosphate, lithium phosphate, ammonium dihydrogen phosphate, phosphate, vanadium phosphate, or a combination thereof;

The carbon source materials comprise graphite, activated carbon, graphene, carbon nanotubes, Ketjen black, sucrose, glucose, bitumen or a combination thereof.

The present invention provides a preparation method for the anode composite material according to the present invention, including the steps of:

(1) Weighing the lithium source material, the sodium source material, the vanadium source material and the phosphate source material by the molar ratio of lithium, sodium, vanadium, phosphate as 1.00-2.70:2.00-0.30:2.00: 3.00, adding the carbon source material (carbon source material is added in an amount of 0.1-40 wt % of the total composite material weight) and mixing, adding a dispersant, and treating the mixture for a period of time (for example, 1-10 hours) with a ball mill, thereby forming a precursor treated by ball milling;

In another preferred embodiment, the dispersant is anhydrous ethyl alcohol or ethylene glycol.

(2) In the presence of protective gas, heat-sintering the precursor treated by ball milling obtained in step (1), thereby obtaining the anode composite material according to the first aspect of the present invention.

The protective gas is hydrogen, nitrogen, argon or a mixture thereof, and preferably a mixture of argon and hydrogen.

The heat-sintering in step (2) can be: roasting at 300-500° C. for 2-20 h, and then increasing the temperature to 600-900° C. to roast for another 8-40 h (preferably 8-20 h).

There may be a drying step between step (1) and step (2): drying the precursor treated by ball milling obtained in step (1) for a period of time (e.g. dried at 30-90° C. for 6-18 h), thereby obtaining a precursor treated by ball milling and dried. The drying step may be performed in an appropriate drying instrument, such as an air dry oven.

It should be understood that, other steps such as grinding step can be included between the drying step and step (2); step (2) comprises cooling step (e.g., natural cooling at room temperature).

In the present invention, the anode composite material having monoclinic and orthorhombic composite structure may also be prepared by ion exchange, the formula of which is $Li_{3-x}V_{2-y}M_y(PO_4)_3/C$, wherein M is Mg, Al, Sc, Ti, Cr, Mn, Fe, Co, Ni, Cu, Zn or Nb, $0 \leq x \leq 3.0$, and $0 \leq y \leq 2.0$.

In the present invention, the anode composite material having monoclinic and orthorhombic composite structure may also be prepared by ion exchange or electrochemical exchange, the formula of which is $Na_{3-x}V_{2-y}M_y(PO_4)_3/C$, wherein M is Mg, Al, Sc, Ti, Cr, Mn, Fe, Co, Ni, Cu, Zn or Nb, $0 \leq x \leq 3.0$, and $0 \leq y \leq 2.0$.

Battery Anode

The battery anode of the present invention comprises the anode composite material of the present invention.

The battery anode of the present invention may further comprise a conductive agent and binder, wherein the conductive agent is acetylene black; the binder is PVDF;

The preferred preparation method includes the following steps of:

uniformly mixing the anode composite material with the binder and the conductive agent, respectively in a solution (e.g. nitrogen methylpyrrolidone (NMP)), adjusting the appropriate mass ratio of anode composite material, acetylene black and binder (e.g., 80-90:5-10:5-10, preferably 90:5:5, 80:10:10 or 85:10:5), and then coating and tableting on the aluminum foil, thereby obtaining the anode.

Secondary Battery

The present invention provides a secondary battery, comprising an anode material and a cathode material, wherein the anode material comprises the phosphate-based battery anode composite material of the present invention.

Preferably, the anode material comprises a composite material of the present invention, which comprises lithium ion and sodium ion. By adjusting the ratio of lithium to sodium in the anode material, the platform voltage of the composite material can be changed and regulated, thereby monitoring battery capacity.

The secondary battery provided by the present invention further comprises a separator, an electrolyte, and a shell. The cathode materials are natural graphite, artificial graphite, mesophase carbon microbeads, silicon carbide, metal lithium sheet or sodium sheet. The separator is a PP & PE membrane or glass fiber membrane, and the electrolyte is the one commonly used for the secondary battery.

The main advantages of the present invention are as follows:

1. The composite material of the present invention has the following advantages: a high potential plateau, a high reversible capacity, a good cycle stability, adjustable platform voltage, electric capacity forecasting, environment-friendly and low cost, etc.

Compared with the current lithium-ion battery, by doping sodium ions, the amount of expensive lithium ion may be effectively reduce, hence significantly reducing the manufacturing costs of the battery.

2. The preparation method for the composite material of the present invention is the solid phase synthesis, wherein the synthesis method is simple, and the cost for raw materials is low, and various raw materials and equipments are easily available.

Compared with the simple physical mixture of lithium vanadium phosphate and sodium vanadium phosphate, the composite material of lithium vanadium phosphate and vanadium sodium phosphate prepared by the method of the present invention has an orthorhombic and monoclinic structural composition. The composition of the two lattice in the material changes with the change of the molar ratio of lithium to sodium, so that the voltage platform of the composite material can be regulated, indicating its broad application prospects in the field of power battery and storage battery.

3. In the anode composite material according to the present invention, the percent of specific charge-discharge capacity of each voltage plateau of the total specific charge-discharge capacity of the material can be adjusted by varying the molar ratio of Li to Na.

Unless defined otherwise, all technical and scientific terms used herein have the same meaning as commonly understood to one of ordinary skill. In addition, any methods and materials similar or equivalent to the content with the present method can be applied in the method of the present invention. Preferred embodiments and materials described in the text for demonstration purposes only. The above mentioned features of the present invention, or features mentioned in embodiments can be any combination. Any feature disclosed in the present specification can be used in combination with any other features, and each feature disclosed in the specification can be replaced with alternative feature which can serve an identical, equivalent, or similar purpose. Therefore, the features disclosed herein are only general exemplary examples of the equivalent or similar features, unless specifically indicated otherwise.

The present invention will be further illustrated below with reference to specific examples. It should be understood that these examples are only to illustrate the present invention but not to limit the scope of the present invention. For the experimental methods without particular conditions in the following examples, they are generally performed under conventional conditions or as instructed by the manufacturer.

EXAMPLE 1

Preparation of Composite Material 1 for Battery Anode Material a. Lithium fluoride, sodium fluoride, ammonium dihydrogen phosphate, ammonium metavanadate and sucrose as raw materials were weighed according to the molar ratio of lithium, sodium, vanadium, phosphate as 2.0:1.0:2:3, 20 wt % of sucrose was added, the resulting mixture was premixed uniformly in a mortar, anhydrous ethanol as a dispersant was added, and then the resulting mixture was treated in a planetary mill for 4 hours, thus obtaining a precursor.

b. The precursor obtained in step a was placed into an air drying oven, and dried at 50° C. for 10 hours. The precursor was taken out and carefully and homogeneously ground.

c. The precursor obtained in step b was placed into a tube furnace, argon-hydrogen mixture was aerated, the temperature was increased to 450° C. at 5° C./min, and the precursor was roasted for 4 hours; the temperature was continually increased to 750° C. at 5° C./min, and the precursor was roasted for another 12 hours.

d. The mixture was taken out after natural cooling, thereby obtaining the product, i.e., the prepared $Li_{2.0}Na_{1.0}V_2(PO_4)_3/C$, composite material 1.

FIG. 1A shows the X-ray diffraction pattern (XRD) of composite material 1, in which the characteristic peaks of the monoclinic $Li_3V_2(PO_4)_3$ and orthorhombic $Li_3V_2(PO_4)_3$ and orthorhombic $Na_3V_2(PO_4)_3$ are obvious, indicating the presence of crystal grains with the monoclinic and orthorhombic structures in the composite material: two crystal structures (monoclinic and orthorhombic) for $Li_3V_2(PO_4)_3$, while only one structure (orthorhombic) for $Na_3V_2(PO_4)_3$, wherein $P_{orthorhombic} > 33\%$.

Figure 1B:
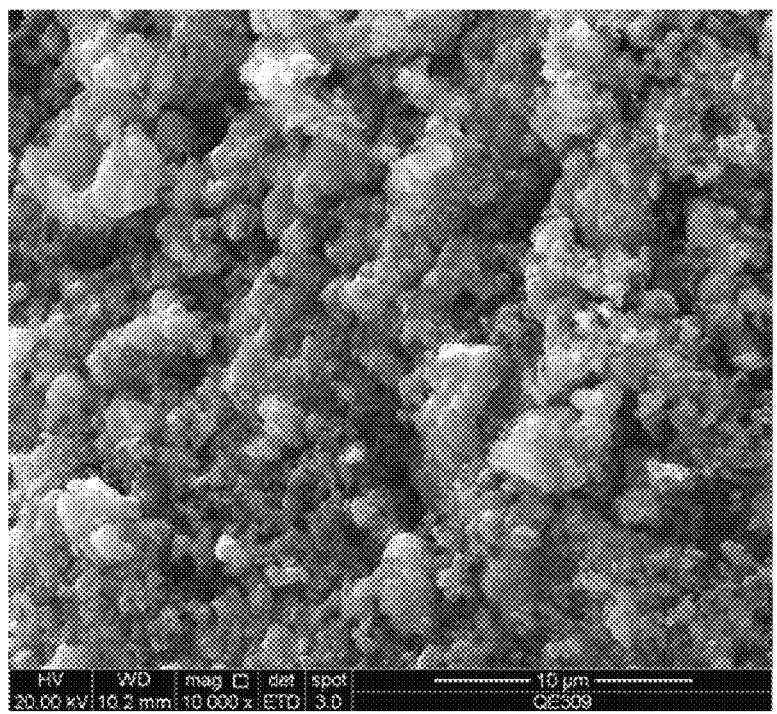
FIG. 1B shows scanning electron microscope pattern of the composite material 1, as prepared in Example 1.

FIG. 1B shows scanning electron microscope (SEM) of composite material 1. The particle diameter of composite material 1 is less than 1000 nm, there is an uniform particle size distribution, and the diameter of smallest crystal grain is less than 100 nm.

Figure 1C:
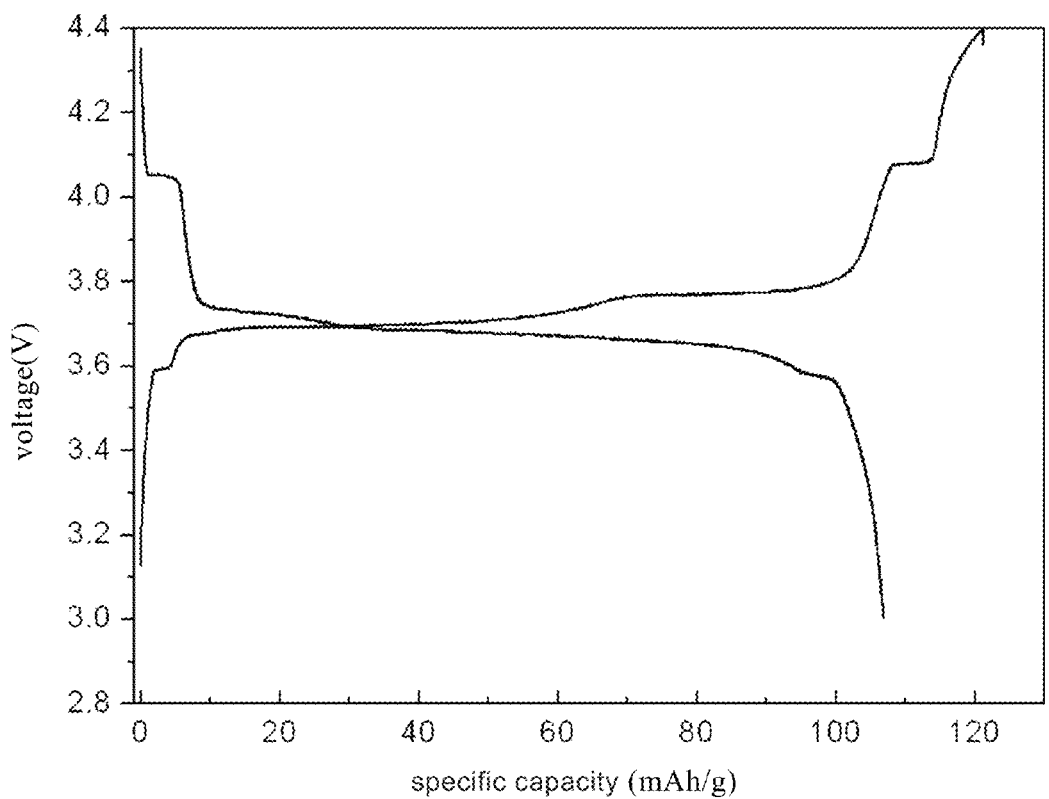
FIG. 1C shows the initial charge-discharge curve of the composite material 1, as prepared in Example 1.

FIG. 1C shows the initial charge and discharge curves at 0.1 C of composite material 1. The initial specific discharge capacity of composite material 1 is up to 108 mAh/g; and there are voltage platforms at 3.6V, 3.7V, 3.8V and 4.1V. However the contribution of 3.6V and 4.1V voltage plateau is short, while the main platforms (at 3.7V and 3.8V) contribute to the larger capacity, and this feature will facilitate to achieve the electric capacity forecasting of battery.

Figure 1D:
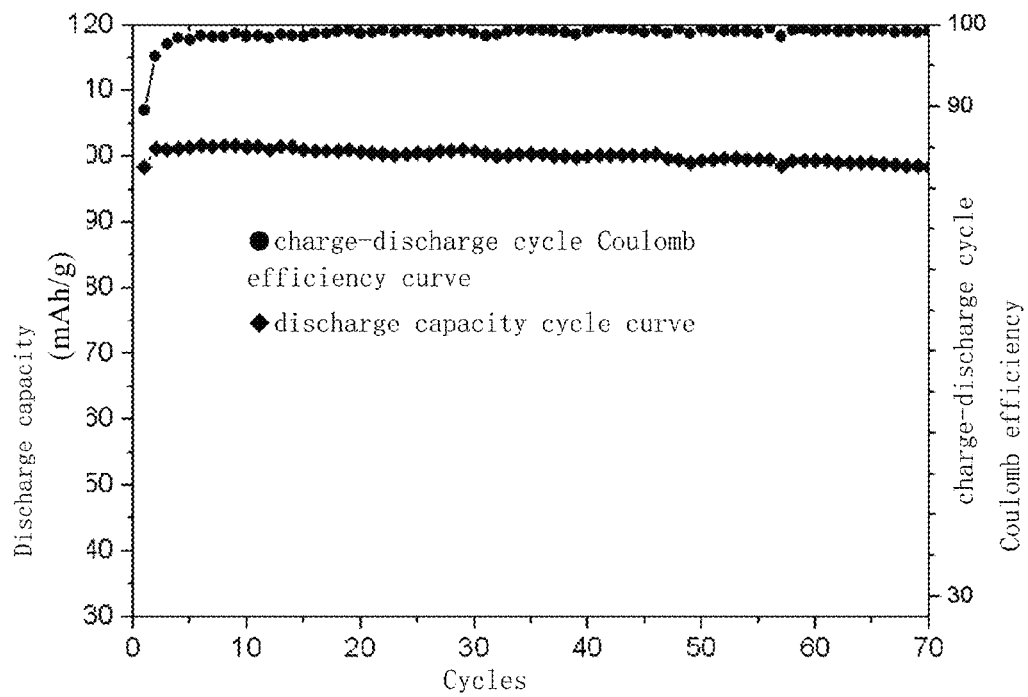
FIG. 1D shows the charge-discharge cycle of the composite material 1, as prepared in Example 1.

FIG. 1D shows the cycle performance and the charge-discharge coulombic efficiency at 0.1 C of composite material 1. In the figure, the abscissa is the number of cycles, the left ordinate is the specific discharge capacity and the right ordinate is the charge-discharge coulombic efficiency. The results showed that there is no significant attenuation in the capacity of the material after cycling for 70 times, and the coulombic efficiency stably maintains at 99%, indicating that composite material 1 has an excellent cycle performance.

EXAMPLE 2

Preparation of Composite Material 2 for Battery Anode Material a. Lithium carbonate, sodium carbonate, ammonium dihydrogen phosphate, ammonium metavanadate and sucrose as raw materials were weighed according to the molar ratio of lithium, sodium, vanadium, phosphate as 1.0:0.5:2:3, 20 wt % of sucrose was added, the resulting mixture was premixed homogeneously in a mortar, anhydrous ethanol was added as a dispersant, and then the resulting mixture was treated in a planetary mill for 4 hours, thus obtaining a precursor.

b. The precursor obtained in step a was placed in an air drying oven, and dried at 60° C. for 12 hours. The precursor was taken out and carefully and homogeneously ground.

c. The precursor obtained in step b was placed in a tube furnace, argon-hydrogen mixture was aerated, the temperature was increased to 350° C. at 5° C./min, and the precursor was roasted for 4 hours; the temperature was continually increased to 700° C. at 5° C./min, and the precursor was roasted for another 12 hours.

d. The mixture was taken out after natural cooling, thereby obtaining the product, i.e., the prepared $Li_{1.5}Na_{1.5}V_2(PO_4)_3$/C, composite material 2.

Figure 2A:
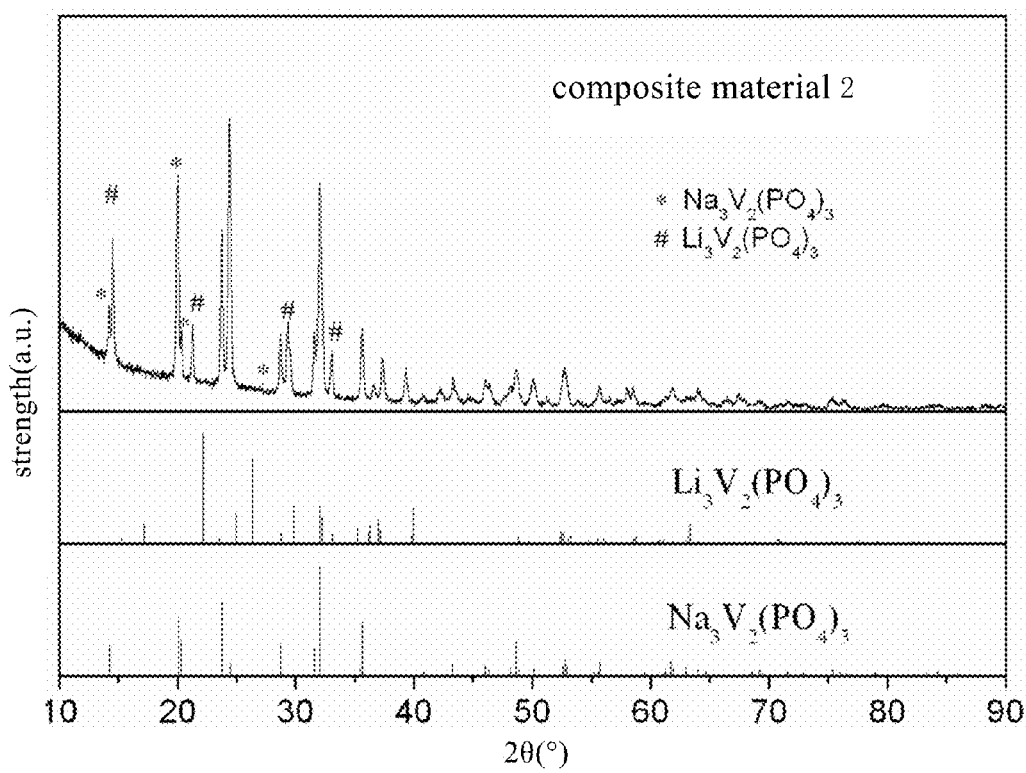
FIG. 2A shows X-ray diffraction pattern of the composite material 2, as prepared in Example 2.

FIG. 2A shows X-ray diffraction pattern (XRD) of composite material 2, in which the characteristic peaks of the monoclinic $Li_3V_2(PO_4)_3$ and orthorhombic $Na_3V_2(PO_4)_3$ are obvious, indicating the presence of crystal grains with monoclinic and orthorhombic structures in the composite material, wherein, $P_{orthorhombic}$>33%.

Figure 2B:
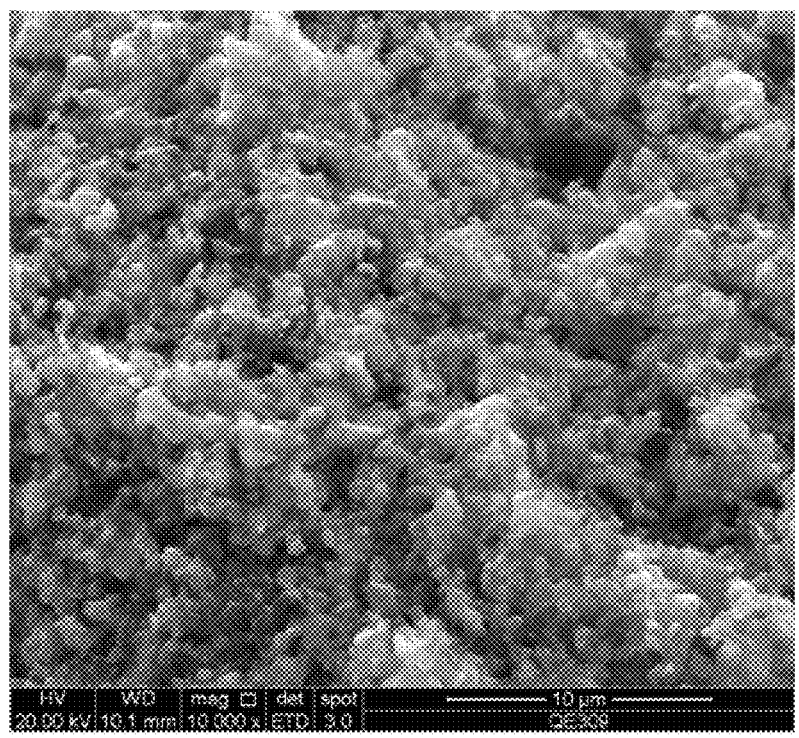
FIG. 2B shows scanning electron microscope pattern of the composite material 2, as prepared in Example 2.

FIG. 2B shows the scanning electron microscope of composite material 2. The particle diameter of composite material 2 is less than 1000 nm, there is an uniform particle size distribution, and the diameter of smallest crystal grain is less than 100 nm.

Figure 2C:
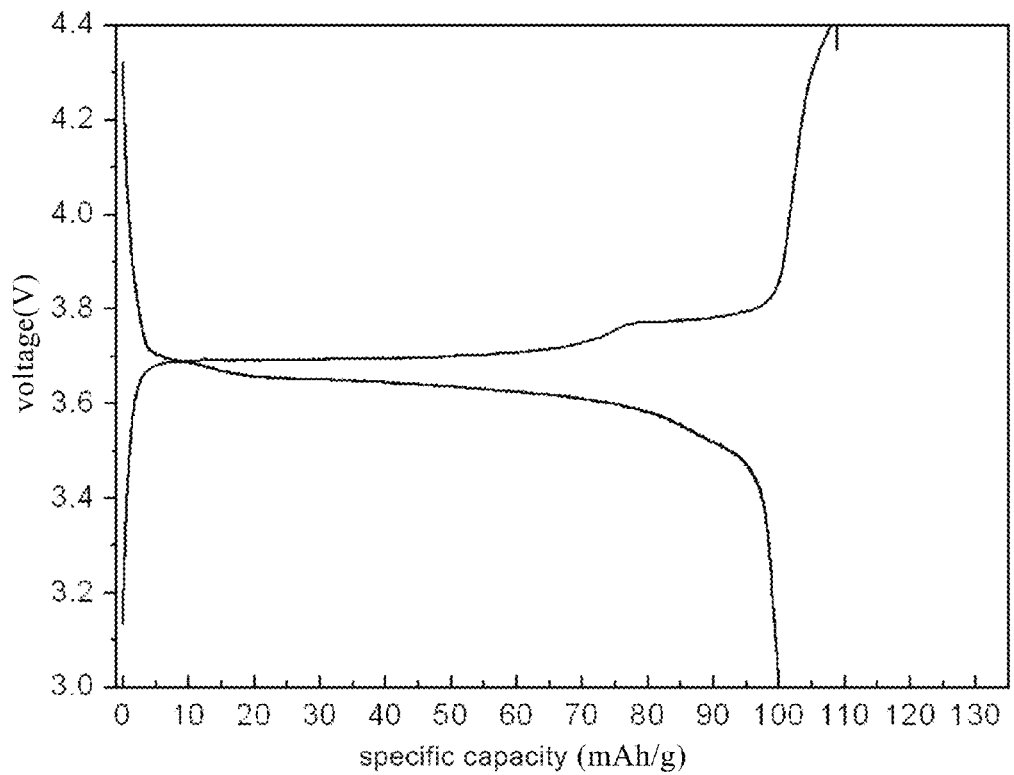
FIG. 2C shows the initial charge-discharge curve of the composite material 2, as prepared in Example 2.

FIG. 2C shows the initial charge and discharge curves at 0.1 C of composite material 2. The initial specific discharge capacity of composite material 2 is about 100 mAh/g; the voltage platform integrates, and the results show those only 3.7V and 3.8V voltage platforms are present.

Figure 2D:
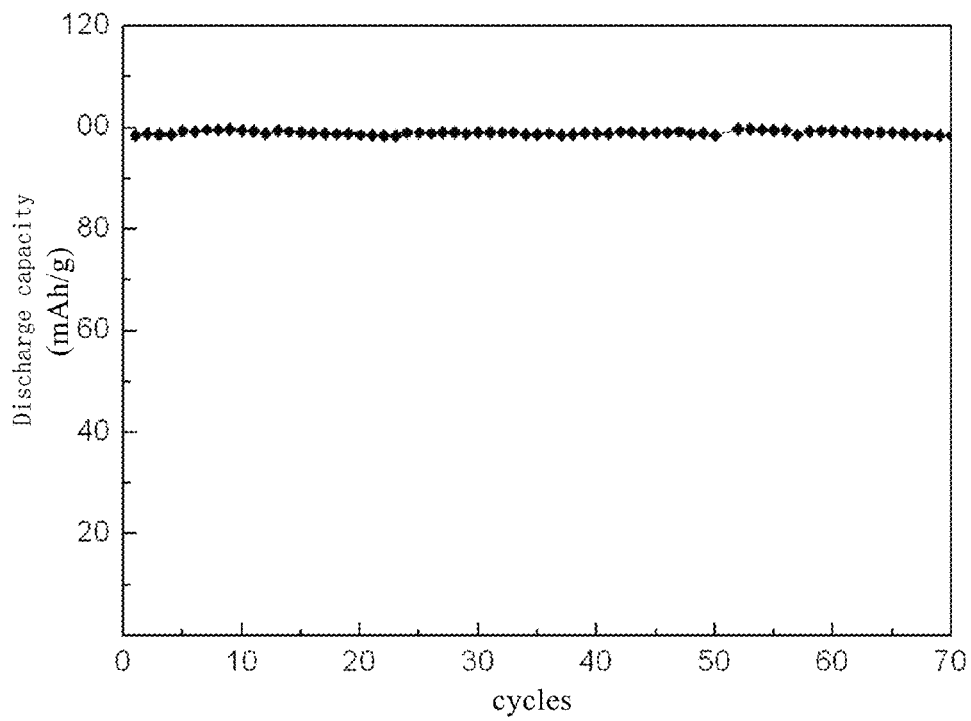
FIG. 2D shows the charge-discharge cycle of the composite material 2, as prepared in Example 2.

FIG. 2D shows the cycle performance at 0.1 C of composite material 2. The results show: there is no significant attenuation in the capacity of the material after cycling for 50 times, indicating that the composite material has an excellent cycle performance.

EXAMPLE 3

Preparation of Composite Material 3 for Battery Anode Material a. Lithium fluoride, sodium fluoride, ammonium dihydrogen phosphate, ammonium metavanadate and sucrose as raw materials were weighed according to the molar ratio of lithium, sodium, vanadium, phosphate as 2.6:0.4:2:3, 20 wt % of sucrose was added, the resulting mixture was premixed uniformly in a mortar, anhydrous ethanol was added as a dispersant, and then the resulting mixture was treated in a planetary mill for 4 hours, thus obtaining a precursor.

b. The precursor obtained in step a was placed in an air drying oven, and dried at 60° C. for 12 hours. The precursor was taken out and carefully and homogeneously ground.

c. The precursor obtained in step b was placed in a tube furnace, argon-hydrogen mixture was aerated, the temperature was increased to 400° C. at 5° C./min, and the precursor was roasted for 4 hours; the temperature was continually increased to 800° C. at 5° C./min, and the precursor was roasted for 12 hours.

d. The mixture was taken out after natural cooling, thereby obtaining the product, i.e., the prepared $Li_{2.6}Na_{0.4}V_2(PO_4)_3$/C, composite material 3.

Figure 3A:
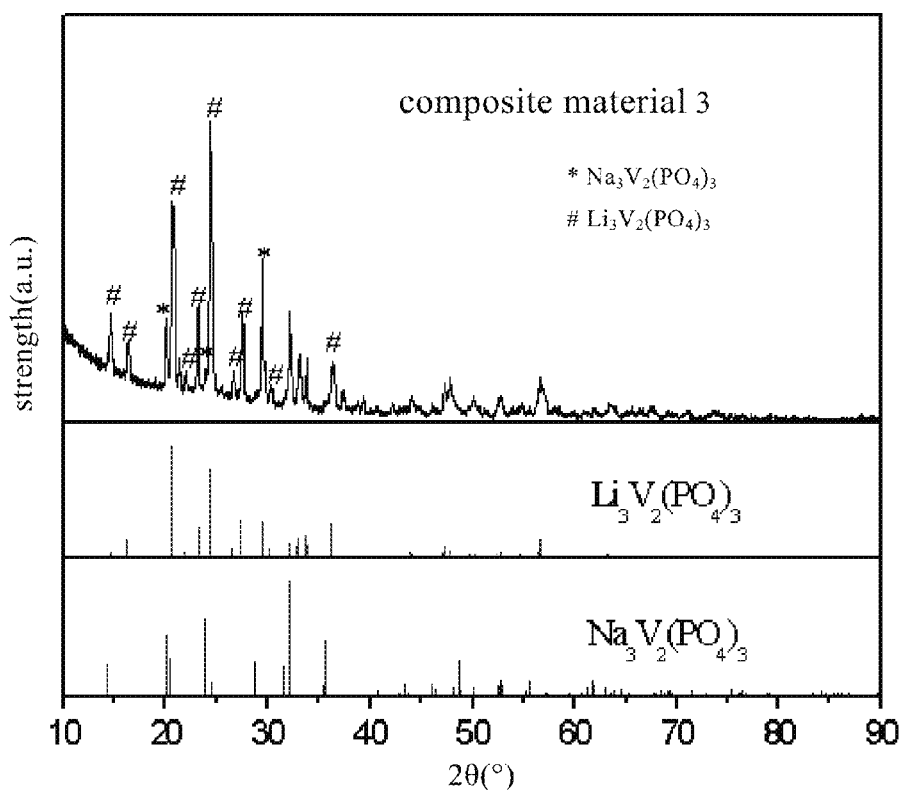
FIG. 3A shows the X-ray diffraction pattern of the composite material 3, as prepared in Example 3.

FIG. 3A shows X-ray diffraction pattern (XRD) of composite material 3, in which the characteristic peaks of the monoclinic $Li_3V_2(PO_4)_3$ and orthorhombic $Na_3V_2(PO_4)_3$ are obvious, indicating the presence of crystal grains with the monoclinic and orthorhombic structures in the composite material, wherein, $P_{orthorhombic}$>13%.

Figure 3B:
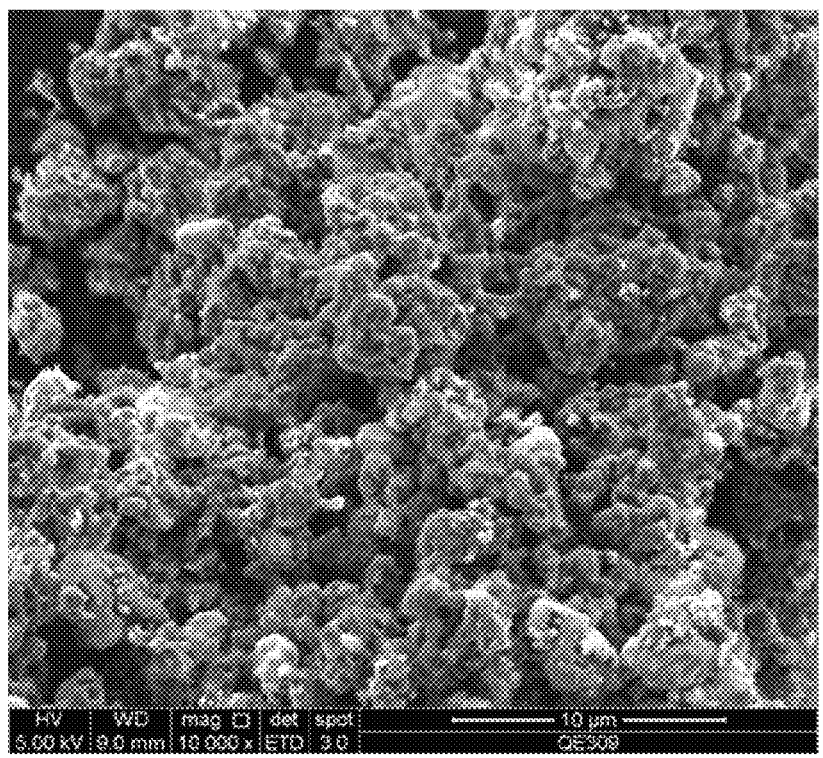
FIG. 3B shows the scanning electron microscope pattern of the composite material 3, as prepared in Example 3.

FIG. 3B shows scanning electron microscope of composite material 3. The particle diameter of composite material 3 is between 100-2000 nm, and there is a uniform particle size distribution.

Figure 3C:
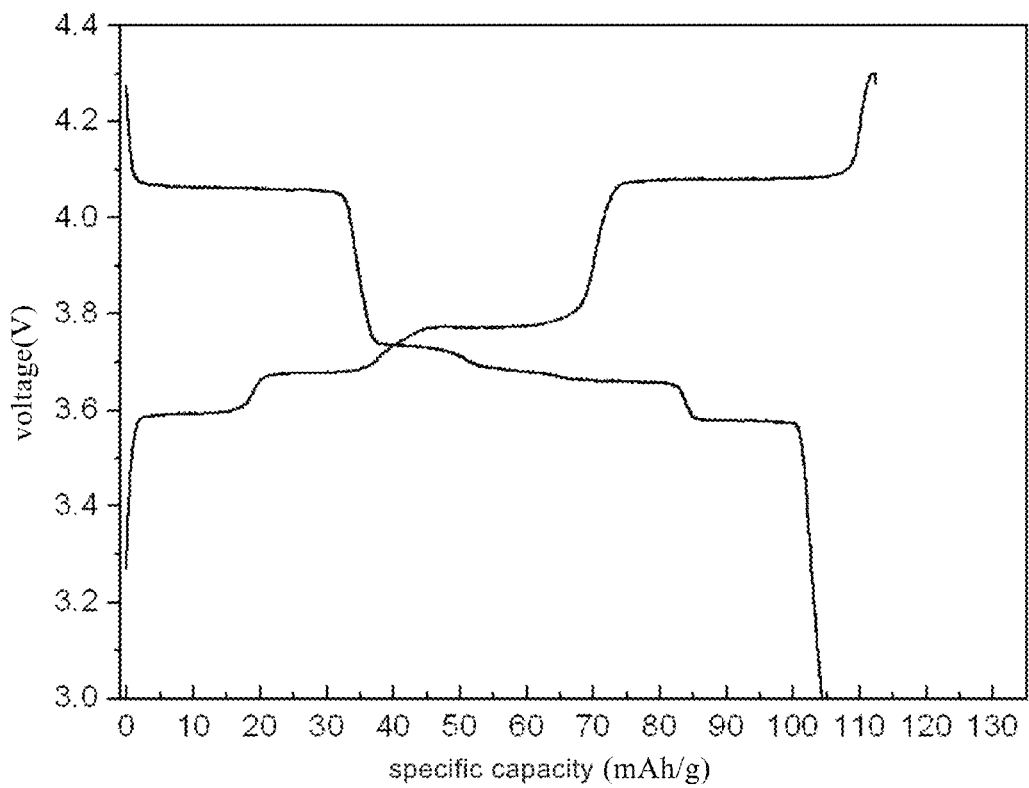
FIG. 3C shows the initial charge-discharge curve of the composite material 3, as prepared in Example 3.

FIG. 3C shows the initial charge and discharge curves at 0.1 C of composite material 3. The initial specific discharge capacity of composite material 3 is about 109 mAh/g; and there are voltage platforms at 3.6V, 3.7V, 3.8V and 4.1V.

EXAMPLE 4

Preparation of Composite Material 4 for Battery Anode Material a. Lithium fluoride, sodium fluoride, ammonium dihydrogen phosphate, ammonium metavanadate, sucrose as raw materials were weighed according to the molar ratio of lithium, sodium, vanadium, phosphate as 2.0:1.0:2:3, 20 wt % of sucrose was added, the resulting mixture was premixed uniformly in a mortar, anhydrous ethanol was added as a dispersant, and then the resulting mixture was treated in a planetary mill for 4 hours, thus obtaining a precursor.

b. the precursor obtained in step a was placed in an air drying oven, and dried at 60° C. for 12 hours. The precursor was taken out and ground carefully and homogeneously.

c. The precursor obtained in step b was placed in a tube furnace, argon-hydrogen mixture was aerated, the temperature was increased to 400° C. at 5° C./min, and the precursor was roasted for 4 hours; the temperature was continually increased to 800° C. at 5° C./min, and the precursor was roasted for 12 hours.

d. The mixture was taken out after natural cooling, thereby obtaining the product, i.e., the prepared $Li_{2.0}Na_{1.0}V_2(PO_4)_3$/C, composite material 4.

Figure 4A:
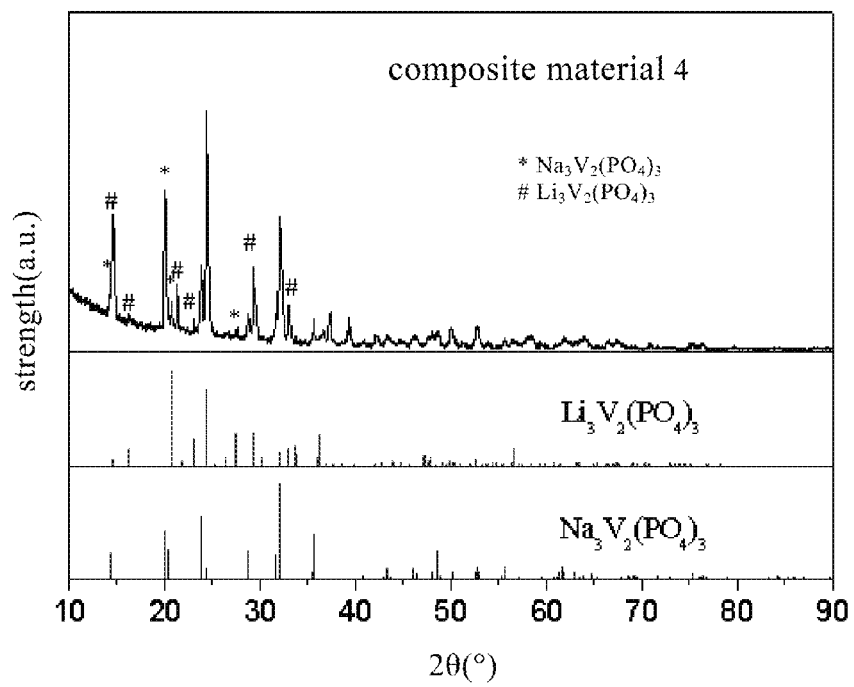
FIG. 4A shows the X-ray diffraction pattern of the composite material 4, as prepared in Example 4.

FIG. 4A shows X-ray diffraction pattern (XRD) of composite material 4, in which the characteristic peaks of the monoclinic $Li_3V_2(PO_4)_3$ and the orthorhombic $Na_3V_2(PO_4)_3$ are obvious, indicating the presence of crystal grains with the monoclinic and orthorhombic structures in the composite material, wherein, $P_{orthorhombic}$>33%.

Figure 4B:
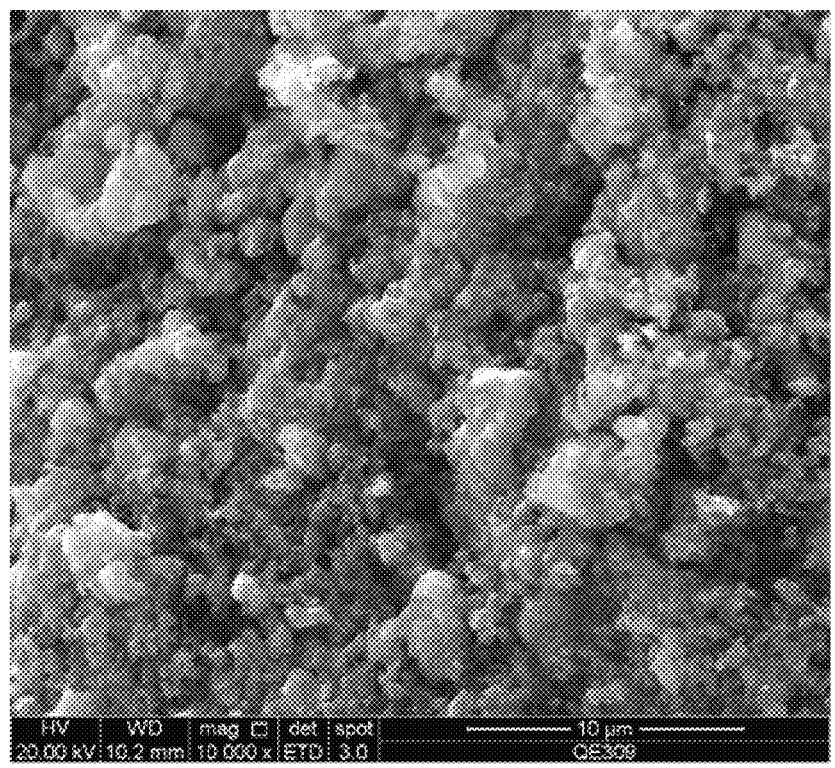
FIG. 4B shows the scanning electron microscope pattern of the composite material 4, as prepared in Example 4.

FIG. 4B shows scanning electron microscope of composite material 4, and there is an uniform particle size distribution.

Figure 4C:
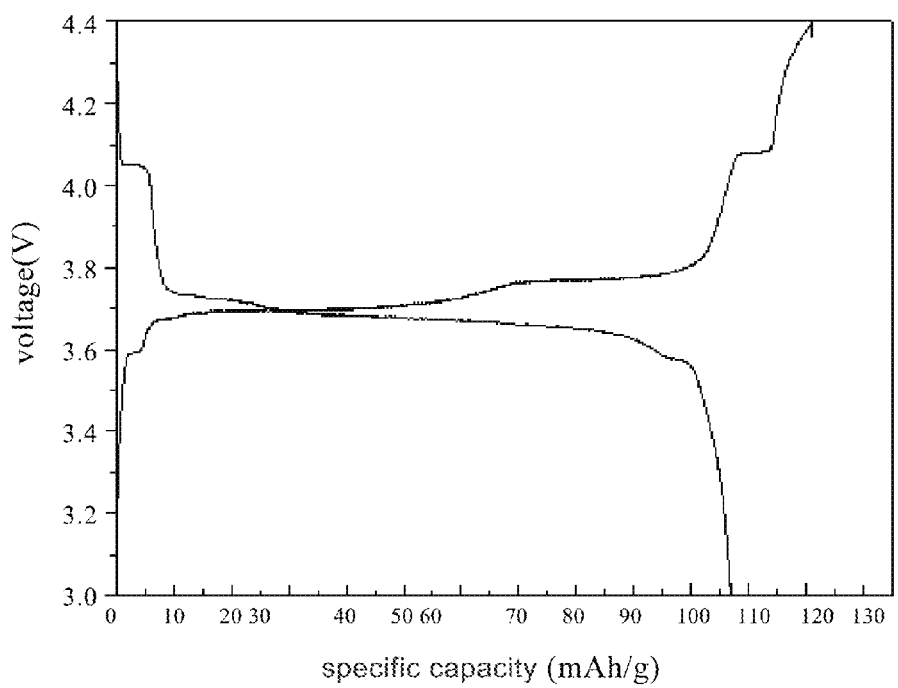
FIG. 4C shows the initial charge-discharge curve of the composite material 4, as prepared in Example 4.

FIG. 4C shows the initial charge and discharge curves at 0.1 C of composite material 4. The initial specific discharge capacity of composite material 4 is up to 106.9 mAh/g; and voltage platforms are mainly at 3.7V and 3.8V, and the voltage platforms at 3.6V and 4.1V are shorter.

COMPARATIVE EXAMPLE 1

Preparation of Comparative Material 1 of the Same Composition as Composite Material 4 Through Traditional Physical Mixing a. Lithium fluoride, ammonium dihydrogen phosphate, ammonium metavanadate and sucrose as raw materials were weighed according to the molar ratio of lithium, vanadium, phosphate as 3:2:3, 5 wt % of sucrose was added, the resulting mixture was uniformly premixed in a mortar, anhydrous ethanol was added as a dispersant, the resulting mixture was treated in a planetary mill for 4 hours, thus obtaining a precursor. The precursor was placed in an air drying oven, and dried at 60° C. for 12 hours. The precursor was taken out, carefully and homogeneously ground, and placed in a tube furnace. Argon-hydrogen mixture was aerated. The temperature was increased to 400° C. at 5° C./min, and the precursor was roasted for 4 hours. The temperature was continually increased to 800° C. at 5° C./min, and the precursor was roasted for 12 hours, thereby obtaining lithium vanadium phosphate $Li_3V_2(PO_4)_3$ having monoclinic structure.

d. Sodium fluoride, ammonium dihydrogen phosphate, ammonium metavanadate, and sucrose as raw materials were weighed according to the molar ratio of lithium, vanadium, phosphate as 3:2:3, 5 wt % of sucrose was added, the resulting mixture was premixed uniformly in a mortar, anhydrous ethanol was added as a dispersant, and then the resulting mixture was treated in a planetary mill for 4 hours, thus obtaining a precursor. The precursor was placed in an air drying oven, and dried at 60° C. for 12 hours. The precursor was taken out and carefully and homogeneously ground, and placed in a tube furnace. Argon-hydrogen mixture was aerated. The temperature was increased to 400° C. at 5° C./min, and the precursor was roasted for 4 hours. The temperature was continually increased to 800° C. at 5° C./min and the precursor was roasted for 12 hours, thereby obtaining sodium vanadium phosphate $Na_3V_2(PO_4)_3$ having monoclinic structure.

c. Lithium vanadium phosphate and sodium vanadium phosphate sintered in a and b were homogeneously mixed at a ratio of 2:1 in an agate mortar, and the resulting mixture was treated in a planetary mill for 4 h, and taken out and dried. The resulting product is $2Li_3V_2(PO_4)_3 \cdot 1Na_3V_2(PO_4)_3$ obtained by traditional physical mixing, marked as comparative material 1.

Figure 5A:
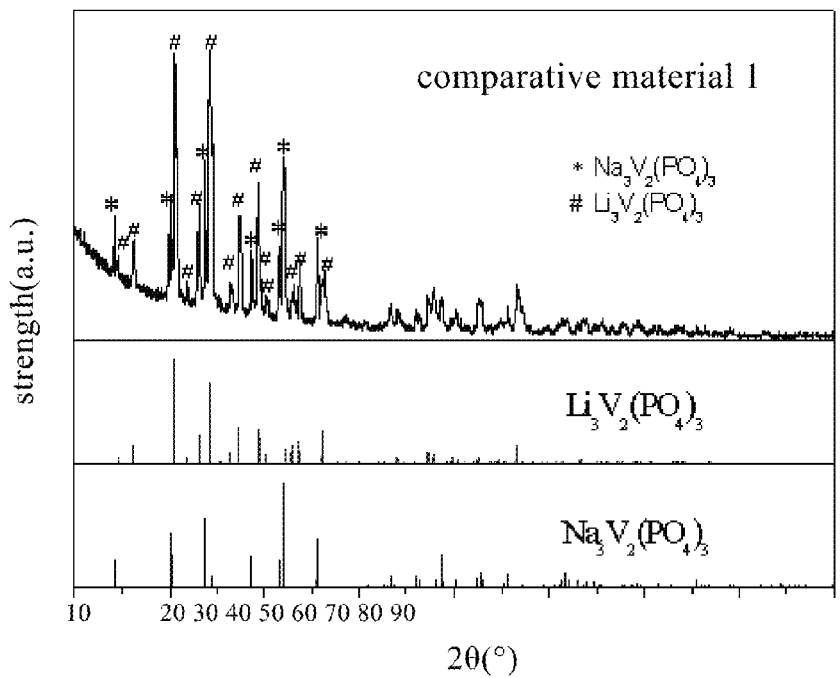
FIG. 5A shows X-ray diffraction pattern of the comparative material 1, as prepared in comparative Example 1.

FIG. 5A shows X-ray diffraction pattern (XRD) of comparative material 1, showing the characteristic peaks of monoclinic $Li_3V_2(PO_4)_3$ and orthorhombic $Na_3V_2(PO_4)_3$, that is, the resulting comparative material is a mixture of two materials.

Figure 5B:
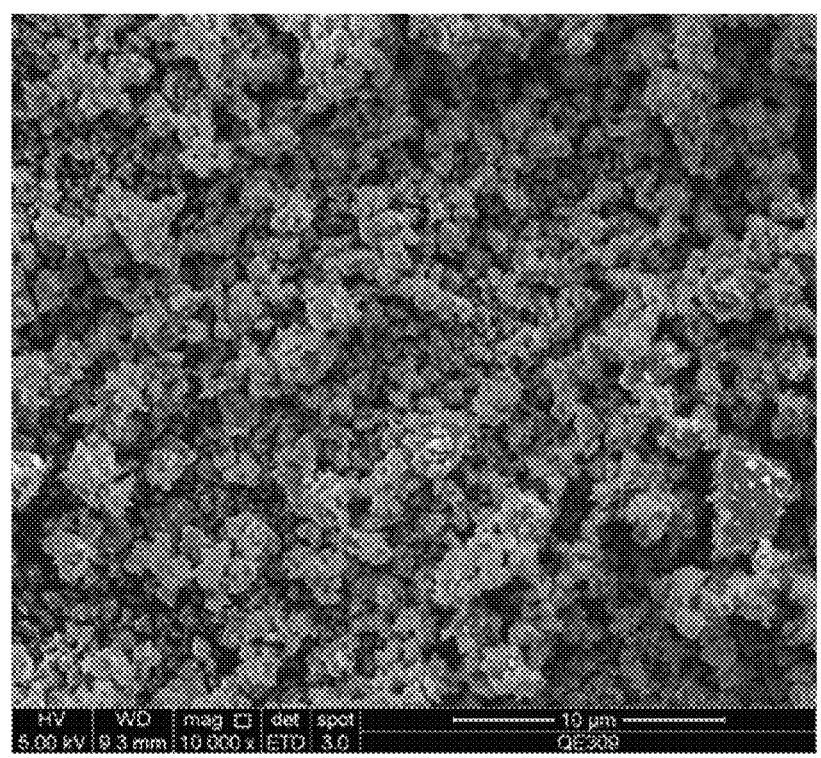
FIG. 5B shows scanning electron microscope pattern of the comparative material 1, as prepared in comparative Example 1.

FIG. 5B shows scanning electron microscope of comparative material 1. There is a uniform particle size distribution for comparative material 1. The diameter of the smallest crystal grain is less than 100 nm.

Figure 5C:
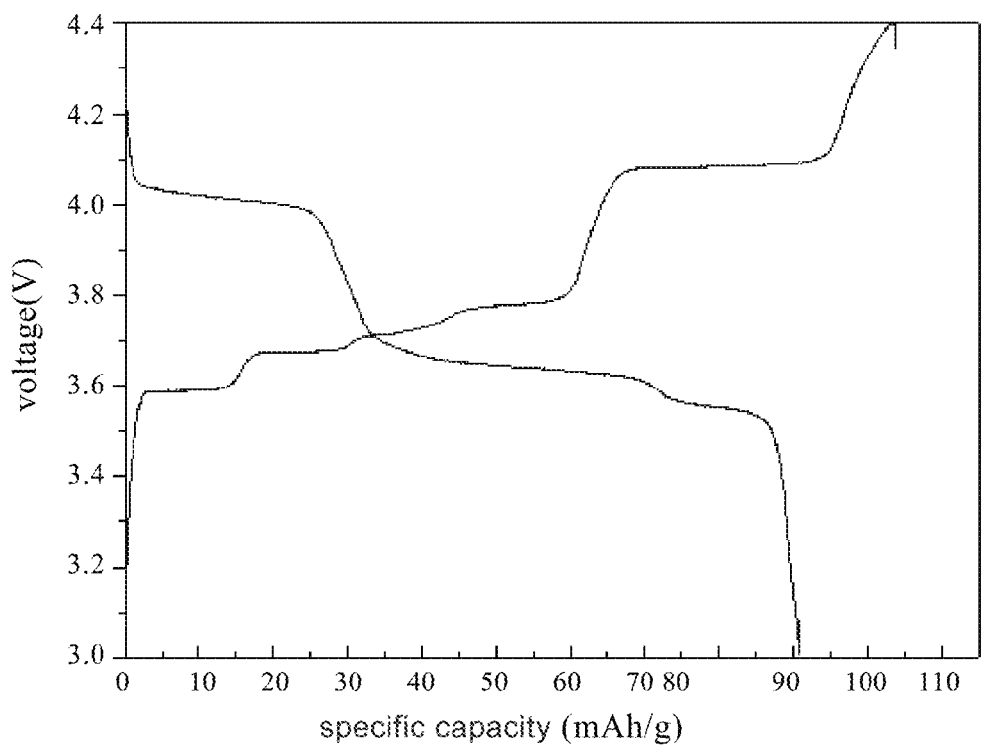
FIG. 5C shows the initial charge-discharge curve of the comparative material 1, as prepared in comparative Example 1.

FIG. 5C shows the initial charge and discharge curves at 0.1 C of comparative material 1. The initial specific discharge capacity of comparative material 1 is about 91.5 mAh/g; the initial charge-discharge curves have the features of monoclinic $Li_3V_2(PO_4)_3$ and orthorhombic $Na_3V_2(PO_4)_3$.

Figure 6:
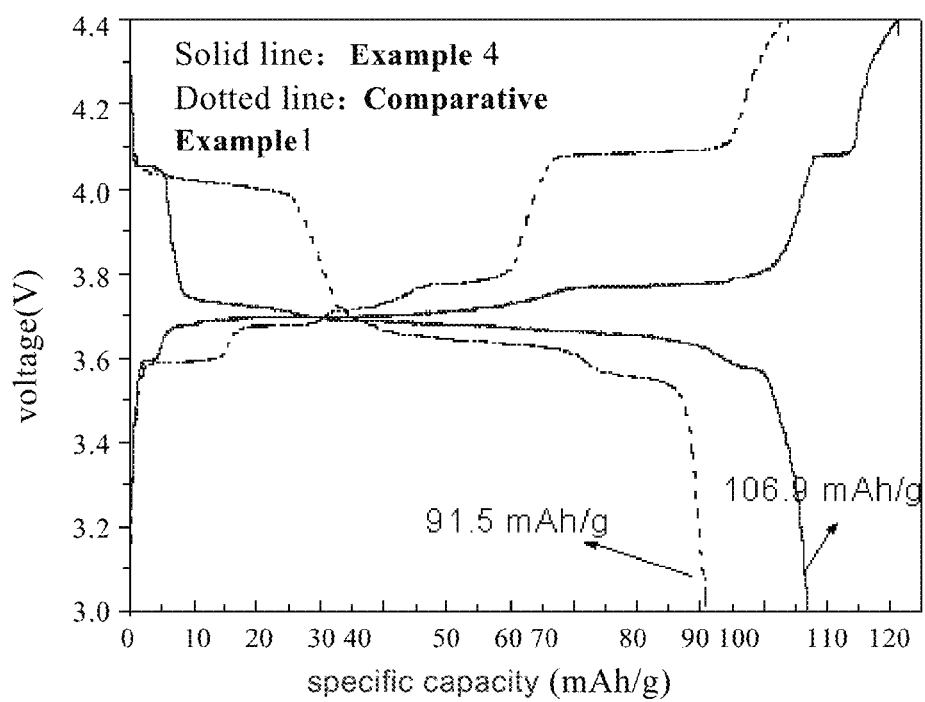
FIG. 6 shows the comparison between the initial charge-discharge curves of the composite material 4 and the comparative material 1.

FIG. 6 shows the comparison between the initial charge-discharge curves at 0.1 C of comparative material 1 and composite material 4, wherein the solid line is the initial charge-discharge curve of example 4, and the dotted line is the initial charge-discharge curve of comparative example 1.

The results showed that: composite material 4 has a higher reversible discharge capacity, and has the advantage of electric capacity forecasting.

EXAMPLE 5

Preparation of Battery Anode 1

Composite material 1 prepared in example 1, the conductive agent (acetylene black), the binder (polyvinylidene fluoride, PVDF) were uniformly mixed in a N-methylpyrrolidone (NMP) solution, according to the mass ratio of composite material 1, acetylene black and binder as 80:10:10, and then coating and tableting on the aluminum foil, thus obtaining the anode.

EXAMPLE 6

Preparation of Battery Anode 2

The preparation method is the same as that of the battery anode 1, except that the composite material is the composite material 2 prepared in example 2.

EXAMPLE 7

Preparation of Battery Anode 3

The preparation method is the same as that of battery anode 1, except that the composite material is the composite material 3 prepared in example 3.

Example 8

Preparation of Battery Anode 4

The preparation method is the same as that of battery anode 1, except that the composite material is the composite material 4 prepared in example 4.

Comparative Example 2

Preparation of Comparative Anode 1

The preparation method is the same as that of battery anode 1, except that the composite material is the comparative material 1 prepared in comparative example 1.

EXAMPLE 9

Preparation of Secondary Battery 1

CR2032 coin type secondary battery was assembled by using battery anode 1, metallic lithium sheet as cathode, 1 mol/l lithium hexafluorophosphate solution in ethylene carbonate and dimethyl carbonate as electrolyte solution, polyethylene of 20 mm in thickness as the separator.

EXAMPLE 10

Preparation of Secondary Battery 2

The preparation method is the same as that of the secondary battery 1, except that the battery anode 2 replaced the battery anode 1.

EXAMPLE 11

Preparation of Secondary Battery 3

The preparation method is the same as that of the secondary battery 1, except that the battery anode 3 replaced the battery anode 1.

EXAMPLE 12

Preparation of Secondary Battery 4

The preparation method is the same as the secondary battery 1, except that the battery anode 4 replaced the battery anode 1.

COMPARATIVE EXAMPLE 3

Preparation of Comparative Battery 1

The preparation method is the same as the secondary battery 1, except that the comparative anode 1 replaced the battery anode 1.

Discussions of the Test Results for Electrochemical Performance (1) FIG. 1C shows that, compared with $Li_3V_2(PO_4)_3$ and $Na_3V_2(PO_4)_3$, there are changes in the voltage plateaus of composite material 1 of the present invention: $Na_3V_2(PO_4)_3$ has a platform at 3.8V voltage, while $Li_3V_2(PO_4)_3$ has three platforms voltages, at 3.6V, 3.7V, and 4.1V respectively. Voltage plateaus at 3.7V and 3.8V of the composite material 1 according to the present invention largely contribute to discharge capacity, and the voltage platforms at 4.1V and 3.6V are shortened. Such feature facilitates to provide electric capacity forecasting before the battery is fully charged or exhausted, allowing one to easily monitor the electricity in a battery.

FIG. 1D shows that the charge-discharge cycle of the composite material 1 of the present invention is very stable.

(2) FIG. 2C shows that, compared with $Li_3V_2(PO_4)_3$ and $Na_3V_2(PO_4)_3$, there are changes in the voltage plateaus of composite material 2 of the present invention at 3.6V, 3.7V, 3.8V and 4.1V. The original voltage plateaus at 3.6V and 4.1V disappear, while platforms at 3.7V and 3.8V become the voltage platforms of the whole battery. The composite material 2 exhibits different characteristics compared with composite material 1, indicating that regulation of voltage platform of a material can be achieved by controlling the Li/Na molar ratio, so that desired battery materials can be designed as required in practical applications.

FIG. 2D shows that the charge-discharge cycle of the composite material 2 of the present invention is very stable.

(3) FIG. 3C shows that, the composite material 3 of the present invention has multiple platform voltages at 3.6V, 3.7V, 3.8V and 4.1V, respectively. The composite material 3 is different from the composite material 1 and the composite material 2 in the molar ratio of Li and Na, which further illustrates that the regulation of voltage plateau of the composite material may be achieved by changing the molar ratio of Li and Na.

(4) FIG. 4C shows that, compared with $Na_3V_2(PO_4)_3$ and $Li_3V_2(PO_4)_3$, voltage plateaus at the 3.7V and 3.8V of the composite material 4 of the present invention largely contribute to discharge capacity, and the voltage platforms at 4.1V and 3.6V are shortened. Such feature facilitates to provide electric capacity forecasting, before the battery is fully charged or exhausted, allowing one to easily monitor the electricity in a battery.

(5) FIG. 5C shows that the comparative material 1, which was physically mixed by mechanical means, completely exhibits respective property of matrix material lithium vanadium phosphate and sodium vanadium phosphate, thus having multiple platform voltages.

(6) The comparison results between the initial charge-discharge curves of composite material 4 and comparative material 1 as shown in FIG. 6 demonstrate that: composite material 4 have the same chemical elements composition as comparative material 1, however, the electrochemical properties of composite material 4 are different from those of comparative material 1 obtained by ordinary physical mixing:

(a) The comparative material 1 has multiple, evenly distributed voltage platforms, while the electrochemical platform of composite material 4 of the present invention changes: the voltage platforms at 3.7V and 3.8V are extended and become the main charge and discharge voltage platforms, and the voltage platforms at 4.1V and 3.6V are shortened, which will facilitate to provide electric capacity forecasting before the battery is fully charged or exhausted, allowing one to easily monitor the electricity in a battery.

(b) Compared with the comparative material 1, the charge-discharge capacity of the composite material 4 is significantly improved.

Summary

1. The anode Composite material of the present invention contains monoclinic and orthorhombic lattice structures, is different from the material obtained by ordinary physical mixing and has multiple, evenly distributed voltage platforms, thus allowing the integration of electrochemical platforms of the material, and achieving the regulation of charge-discharge voltage plateau of the composite material, depending on varying needs.

2. The anode composite material of the present invention exhibits an excellent charge-discharge cycle performance, and by varying the ratio of lithium to sodium, the discharge capacity of precursor material of lithium vanadium phosphate and sodium vanadium phosphate can be regulated, and the regulation of the charge and discharge voltage plateau may be achieved, so that the battery has an electric capacity forecasting function. Therefore, it has broad application prospects, great market value and practical applicability within the field of power and storage batteries.

All literatures mentioned in the application are incorporated by reference herein, as though individually incorporated by reference. Additionally, it should be understood that after reading the above teaching, many variations and modifications may be made by the skilled in the art, and these equivalents also fall within the scope as defined by the appended claims.

We claim:

1. A phosphate-based battery anode composite material, wherein the composite material comprises (1) crystal grains of lithium vanadium phosphate salt and sodium vanadium phosphate salt, and (2) a carbon layer coated outside of the crystal grains, wherein the crystal grains have both a monoclinic lattice structure and an orthorhombic lattice structure;

and in the composite material, a molar content of the crystal grains having an orthorhombic lattice structure ($P_{orthorhombic}$) is 1-99% of total moles of the crystal grains of sodium vanadium phosphate salt and lithium vanadium phosphate salt;

and a formula of the composite material is $A_{3-x}V_{2-y}M_y(PO_4)_3/C$, wherein A is a mixture of $Li^+$ and $Na^+$, and M is Mg, Al, Sc, Ti, Cr, Mn, Fe, Co, Ni, Cu, Zn or Nb, $0 \leq x < 3.0$ and $0 \leq y < 2.0$; and C is a carbon layer;

and in the anode composite material, a molar ratio of Li and Na is between 3.0 and 1.5 to between greater than 0 and 1.5;

and the composite material has one to four voltage plateaus; a platform voltage is selected from the group consisting of about 3.6V, about 3.7V, about 3.8V, and about 4.1V;

and a particle diameter of the composite material is between 100-2000 nm.

2. The anode composite material of claim 1, wherein the lithium vanadium phosphate salt of the crystal grains has the monoclinic and the orthorhombic lattice structures; or the lithium vanadium phosphate salt of the crystal grains has only the monoclinic lattice structure.

3. The anode composite material of claim 1, wherein the sodium vanadium phosphate salt of the crystal grains has the orthorhombic lattice structure.

4. The anode composite material of claim 1, wherein the composite material is used in a lithium ion battery, wherein the sodium ion does not participate in the reaction during the charging and discharging process;

the composite material is used in a sodium lithium ion battery, wherein the lithium ion does not participate in the reaction during the charging and discharging process; and the composite material is used in a secondary battery, wherein both of the lithium ion and the sodium ion are involved in reactions during the charging and discharging process.

5. The anode composite material of claim 1, wherein the formula of the composite material is $Li_{3-x-a}Na_aV_{2-y}M_y(PO_4)_3/C$, wherein $0\leq a\leq 1.0$, $0\leq y<2.0$, $0\leq x<3-a$, M is Mg, Al, Sc, Ti, Cr, Mn, Fe, Co, Ni, Cu, Zn or Nb, and C is a carbon layer.

6. The anode composite material of claim 1, wherein the formula of the composite material is $Na_{3-x-b}Li_bV_{2-y}M_y(PO_4)_3/C$, wherein $0\leq b\leq 1.0$, $0\leq y\leq 2.0$, $0\leq x<3-b$, M is Mg, Al, Sc, Ti, Cr, Mn, Fe, Co, Ni, Cu, Zn or Nb, and C is a carbon layer.

7. The anode composite material of claim 1, wherein the formula of the composite material is $Li_{3-a-x}Na_{a-z}V_{2-y}M_y(PO_4)_3/C$, wherein $0.1\leq a\leq 2.9$, $0\leq x<3-a$, $0\leq z\leq a$, $0\leq y<2.0$, M is Mg, Al, Sc, Ti, Cr, Mn, Fe, Co, Ni, Cu, Zn or Nb, and C is a carbon layer.

8. The anode composite material of claim 1, wherein a preparation method for the composite material includes the steps of:

(1) weighing a lithium source material, a sodium source material, a vanadium source material and the phosphate source material by the molar ratio of lithium, sodium, vanadium, phosphate as 1.00-2.70:2.00-0.30:2.00:3.00, adding a carbon source material in an amount of 0.1-40 wt % of the total composite material weight and mixing, adding dispersant, and then treating the resulting mixture by ball mill, thereby forming a precursor treated by ball milling; and (2) in the presence of a protective gas, heat-sintering the precursor treated by ball milling obtained in step (1), thereby obtaining the anode composite material.

9. The anode composite material of claim 1, wherein the content of the carbon layer is 0.1-40 wt % of the total weight of the composite material; and/or the carbon layer is made from a carbon source selected from the group consisting of pyrolytic carbon, graphite, and a mixture thereof.

10. A battery anode, wherein the anode comprises the anode composite material of claim 1.

11. The battery anode of claim 10, wherein the anode comprises a conductive agent and binder.

12. A secondary battery, wherein the battery comprises the battery anode of claim 10.

13. A secondary battery, wherein the secondary battery comprises an anode material, cathode material, separator, electrolyte, and shell, and wherein the anode material comprises the phosphate-based battery anode composite material of claim 1.

14. A preparation method for an anode composite material of claim 1, wherein the method comprises the following steps:

(1) weighing a lithium source material, a sodium source material, a vanadium source material and a phosphate source material by a molar ratio of lithium, sodium, vanadium, and phosphate as 1.00-2.70:2.00-0.30:2.00:3.00, adding a carbon source material in an amount of 0.1-40 wt % of the total composite material weight and mixing, adding a dispersant, and then treating the resultant mixture by a ball mill, thereby forming a precursor treated by ball milling; and (2) in the presence of protective gas, heat-sintering the precursor treated by ball milling obtained in step (1), thereby obtaining the anode composite material of claim 1;

the heat-sintering in step (2) involves roasting at 300-500° C. for 2-20 h, and then increasing the temperature to 600-900° C. and roasting for another 8-40 h.

15. The preparation method of claim 14, wherein the dispersant is anhydrous ethyl alcohol or ethylene glycol.

16. The preparation method of claim 14, wherein the protective gas is hydrogen, nitrogen, argon or a mixture thereof.

* * * * *